United States Patent

[11] 3,599,985

[72] Inventor William B. Huber
Park Forest, Ill.
[21] Appl. No. 804,504
[22] Filed Mar. 5, 1969
[45] Patented Aug. 17, 1971
[73] Assignee Motorola, Inc.
Franklin Park, Ill.

[54] CARTRIDGE LOCKING AND EJECTOR MECHANISM
10 Claims, 3 Drawing Figs.

[52] U.S. Cl. .......... 274/4 B
[51] Int. Cl. .......... G11b 5/00
[50] Field of Search .......... 274/4, 11; 352/74; 179/100.22

[56] References Cited
UNITED STATES PATENTS

| | | | |
|---|---|---|---|
| 3,009,024 | 11/1961 | Eash .......... | 274/4 |
| 3,485,500 | 12/1969 | Loeschner et al. .......... | 274/4 B |

*Primary Examiner*—Harry N. Haroian
*Attorney*—Mueller, Aichele & Rauner

ABSTRACT: A tape locking and ejector mechanism for cartridge-tape players comprises a lever carrying intermediate the ends a first projection which extends into the path of movement of a cartridge when inserted into the apparatus. The lever is pivoted at one end; so that when the cartridge engages the projection, the lever is pivoted from a first position to which it is spring biased to a second position. A holding solenoid is located adjacent the other end of the lever when it is at the second position; and when a second projection on this other end of the lever moves into the magnetic field of the solenoid, it is held thereby so that the lever remains in the second position as long as the solenoid is energized. The pivoted end of the lever carries a cantilever leaf spring having a roller at its unsupported end, with the roller engaging a notch in the tape cartridge when the lever is pivoted to its second position to hold the cartridge in playing position. Upon deenergization of the solenoid, the biasing spring connected to the lever operating in conjunction with the leaf spring, pulls the lever back to its first position, causing the tape cartridge to be ejected and causing the spring-biased roller to be disengaged from the notch in the cartridge.

PATENTED AUG 17 1971

3,599,985

INVENTOR
WILLIAM B. HUBER
BY Mueller, Aichele & Rauner
ATTORNEYS

CARTRIDGE LOCKING AND EJECTOR MECHANISM

BACKGROUND OF THE INVENTION

In cartridge-type tape players currently being used extensively in automobiles and in other reproducing systems, it is necessary to provide some means for firmly positioning or locking the cartridge against the tape-driving capstan and head when the cartridge is inserted into the player.

It also is desirable to provide a means for ejecting the cartridge from the player after it has been played to facilitate removal of the cartridge from the player and, in addition, to prevent the occurrence of plastic deformation of the pressure roller in the cartridge which could otherwise occur if the cartridge were left in contact with the capstan for prolonged periods of time. This problem is especially noticeable in a cartridge left in a tape player located in a relatively cold ambient temperature, such as occurs often in automobiles during the winter.

Most mechanisms for accomplishing such locking and ejecting involve relatively complicated mechanical devices which generally are manually operated. It is desirable to provide a cartridge locking and ejecting mechanism which operates automatically and which always ejects the cartridge whenever the tape player is turned off.

SUMMARY OF THE INVENTION

It is an object of this invention to provide a tape cartridge locking and ejecting mechanism which is automatically operated.

It is another object of this invention to provide an improved cartridge locking and ejecting mechanism utilizing relatively few parts and which is of simple construction.

In a preferred embodiment of this invention, a locking and ejecting mechanism for tape cartridges includes a linkage biased to a first position and carrying a projection extending into the path of movement of the cartridge. When the tape cartridge is moved to engage the projection, the linkage is caused to move to a second position where a solenoid attracts and holds the linkage in a second position. The linkage also carries a cartridge-engaging means which engages the cartridge when the linkage is in the second position to firmly lock the cartridge in playing position. When the solenoid is deenergized, the biasing means pulls the linkage into its first position to release the engaging means and to cause the projection to eject the cartridge from the player.

DETAILED DESCRIPTION

Figure 1:
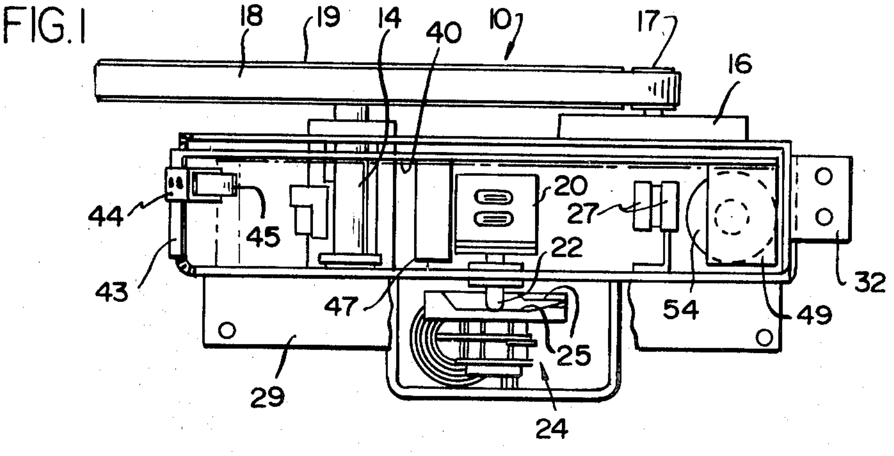
FIG. 1 is a front elevation view showing a tape player apparatus in accordance with a preferred embodiment of this invention.

Referring now to the drawing, in which like reference numerals are used throughout the several views to identify the same parts, FIG. 1 shows a tape player apparatus 10 which is adapted to receive and play standard tape cartridges, such as the cartridge 12 (FIG. 2), having a multitrack tape therein and which is positioned to cause the cartridge pressure roller to be engaged by a capstan shaft 14 to drive the tape through the cartridge 12. An electric motor 16 drives a pulley 17, which is connected through a belt 18, to the capstan flywheel 19 which, in turn, causes rotation of the capstan 14. A magnetic-tape-reproducing head 20 is positioned by a cam follower 22 which rides on a cam 24 having a plurality of cam surfaces 25 thereon. Whenever one of the plurality of sets of tracks of the tape is completed, a conductive strip on the tape bridges a pair of contacts 27 to energize a solenoid 29 which, in turn, causes the cam 24 to be rotated to present a different cam surface 25 to the cam follower 22. This repositions the magnetic tape head 20 to cause the player to play a different set of tracks on the tape. This portion of the tape player shown in the drawing is conventional, and is described so that the cooperation of the cartridge locking and ejecting mechanism with the player will be more easily understood.

Figure 2:
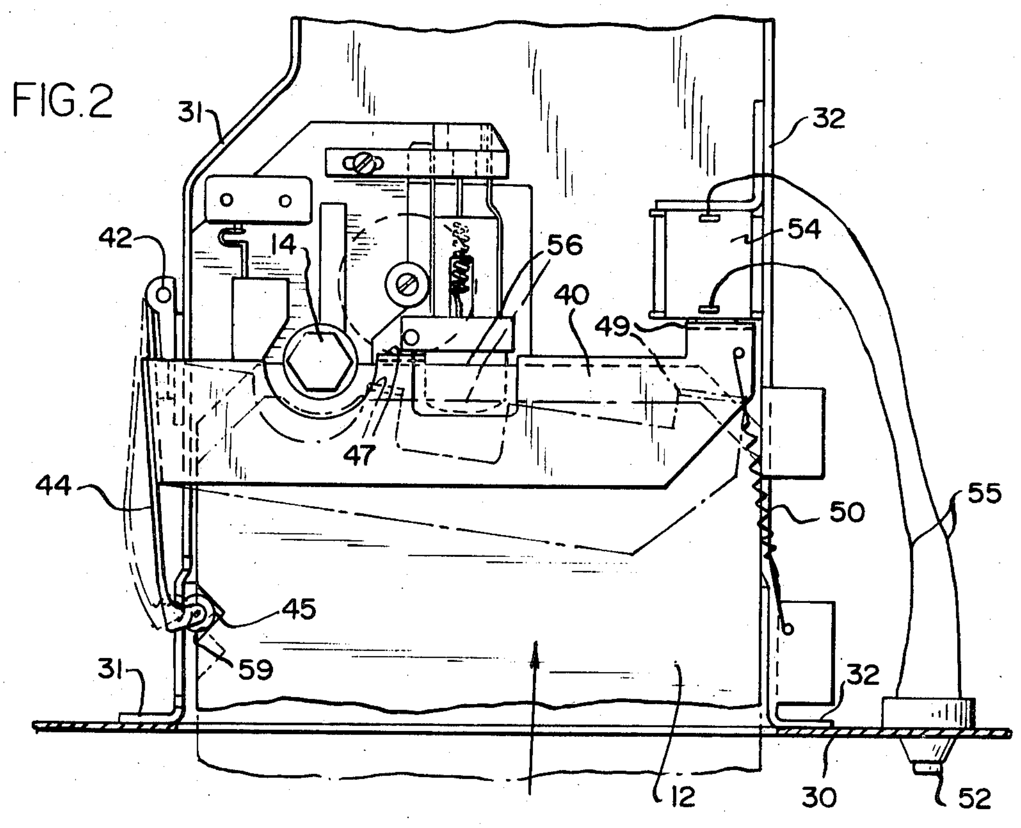
FIG. 2 is a partially cutaway top plan view of the apparatus shown in FIG. 1.

The tape player shown in FIG. 1 may be mounted on an automobile dashboard, and, referring to FIG. 2, there is shown a dashboard plate 30 having an opening therein for receiving cartridges and to which the sideplates 31 and 32 of the tape player housing are fastened by any suitable fastening devices, such as by welding, screws or the like. The sides 31 and 32 of the tape player housing define side guiding channels for the tape cartridges 12, and a plate on the bottom of the tape player 10 provides a lower guiding surface for the cartridges 12.

Figure 3:
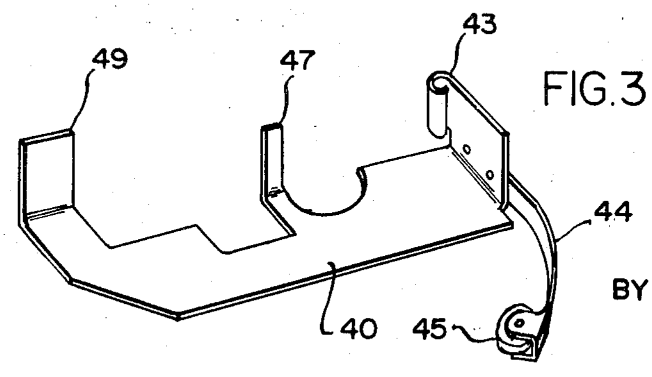
FIG. 3 is a detail of the cartridge locking and ejecting linkage mechanism used in conjunction with the tape player shown in FIGS. 1 and 2.

In order to provide for automatic locking and ejection of the cartridges 12 in the tape player 10, a locking and ejector linkage in the form of a linkage arm or lever 40 is provided. The details of this lever or linkage may best be seen by reference to FIG. 3. The linkage 40 extends substantially across the cartridge-receiving channel of the tape player and, as is most clearly shown in FIG. 2, is pivotally mounted on a pivot 42 which is attached to the side 31 of the tape player housing.

A pivot-engaging extension 43, mounted substantially at right angles to the main body portion of the arm 40, also has mounted thereon a cantilever leaf spring 44, carrying a roller 45 at its unsupported end. The leaf spring 44 is bent into an arcuate position, which is its relaxed position, causing the roller 45 to extend inwardly at an acute angle toward the opposite end of the arm 40.

Intermediate its ends, the arm 40 has a cartridge ejection projection 47, extending at right angles to the plane of the arm 40 and extending substantially across the opening for receiving the tape cartridges 12. The manner in which the arm 47 extends across the opening may best be seen by reference to FIG. 1. At the end of the arm 40, opposite the pivoted end, there is a second projection 49 which also extends into and across the opening for receiving the tape cartridges; but the projection 49 is located in a different plane from the plane of the projection 47 so that it is located nearer the rear of the player. The arm 40 is biased to a first position toward the opening in the dashboard plate 30 by means of a tensioned spring 50 connected between a pin mounted on the frame 32 and a pin located at the end of the arm carrying the projection 49.

In the absence of a cartridge in the tape player 10, the arm 40 is biased by the spring 50 to the position shown in the dashed line in FIG. 2. In this position, the projections 47 and 49 extend into the cartridge-receiving opening in a region which normally is occupied by the cartridge when the cartridge is inserted into the player in its playing position. When the arm 40 is in this position, the spring 44 is relaxed and the roller 45 is out of the cartridge-receiving channel, as may be seen by reference to the dashed line indication of these elements in FIG. 2.

Now assume that a tape cartridge is inserted into the player. The player may be energized by an on-off switch which may be connected in tandem with a cartridge-sensing switch and the ignition switch of the automobile in any of a number of suitable configurations. For the purposes of illustration, an on-off switch 52 is shown as connected to the dashboard plate 30; and when this switch is energized to complete an electrical connection to energize the tape player, a solenoid 54 also is energized through a pair of connecting wires 55 connected to the switch 52. In the absence of a tape cartridge in the player the solenoid 54 has no affect on the operation of the device.

When a tape cartridge 12 is inserted into the receiving chamber of the tape player in the direction of the arrow shown in FIG. 2, it moves toward the rear of the player until the leading edge 56 of the cartridge 12 strikes the ejection projection 47, whereupon continued movement of the cartridge 12 in the direction of the arrow causes the arm 40 to be pivoted in a counterclockwise direction about the pivot 42 (as viewed in FIG. 2). The movement of the arm 40 in a counterclockwise direction is against the action of the spring 50 which tends to bias the arm to the dashed line position, as stated previously.

When the projection 49 is moved into the magnetic field generated by the solenoid 54, it is attracted by the solenoid 54 which draws and holds the arm 40 in the position shown in the solid line of FIG. 2. This causes the ejection projection 47 to be pulled away from the front edge 56 of the cartridge In addition, movement of the arm 40 to this position, causes the roller 45 to tightly engage the left-hand edge of the cartridge 12 (as viewed in FIG. 2) under the urging of the spring 44 and to fall into a notch 59 provided in the side of the cartridge 12. The roller 45, pressing into the notch 59 under the urging of the spring 44, causes the cartridge 12 to be forced into registry with the right-hand sideplate 32 of the housing and to be forced into position so that the pressure roller in the cartridge 12 engages the capstan 14. In this manner, the tape cartridge 12 is locked into playing or operating position.

When it is desired to eject the cartridge, or whenever the power supply for the player 10 is opened, operating current for the solenoid 54 is interrupted, and the solenoid 54 is deenergized. When this occurs, the action of the spring 50 pulls the right-hand end of the arm 40 (as viewed in FIG. 2) downwardly in a clockwise direction, pivoting the arm about the pivot member 42. The projection 47 on the arm 40 engages the front surface 56 of the tape cartridge 12 and pushes the cartridge in the opposite direction from the arrow shown in FIG. 2. At the same time, the roller 45 is pulled out of engagement with the notch 59 and no longer engages the side of the cartridge 12; so that the cartridge may be easily removed from the player.

It should be noted that when the cartridge is in a position intermediate the two positions shown in the drawing, the roller 45 engages the edge of the notch 59 to hold the cartridge 12 in frictional engagement with the right-hand sideplate 32 of the tape player cartridge-receiver housing. This prevents the cartridge from flying out of the tape player but permits it to be ejected from the playing position to a position where it may be easily manually grasped and completely removed from the tape player 10.

It may be desirable to provide a lower limit stop for the free end of the arm 40, so that the arm 40 is held against the stop under the urging of the spring 50 when no tape cartridge 12 is placed in the recorder. This then would prevent any undesirable vibration of the arm 40, caused by the vibration of the automobile in which the player is mounted. Such a lower limit stop is not, however, necessary to the operation of the locking and ejecting mechanism shown in the drawing.

I claim:

1. Apparatus using an exchangeable cartridge, including in combination:

linkage means;

means for biasing the linkage means to a first position;

a solenoid means;

ejector means coupled to the linkage means and engageable by a cartridge moving into the apparatus for moving the linkage means from said first position toward a second position, movement of the ejector means by movement of the cartridge causing a portion of the linkage means to be moved near and to be attracted by the solenoid means to hold the linkage means in said second position so long as the solenoid means is energized; and means coupled to the linkage means for engaging the cartridge to move and hold the same with the linkage means being moved from the first to said second position, the biasing means returning the linkage means to said first position when the solenoid means is deenergized, causing the ejector means to eject the cartridge.

2. The combination according to claim 1 wherein the biasing means constitutes a spring.

3. The combination according to claim 1 wherein the ejector means comprises a projection on the linkage means extending into the path travelled by the cartridge being inserted into the apparatus.

4. The combination according to claim 3 wherein the linkage means is a lever pivoted at one end and carrying on the opposite end thereof a second projection forming said portion of the linkage means being movable into the magnetic field of the solenoid and being attracted thereby.

5. The combination according to claim 4 wherein the end of the lever which is pivoted carries thereon a further spring-biased cartridge-engaging means which engages said cartridge when the lever is moved from said first position to said second position 6. The combination according to claim 5 wherein the cartridge-engaging means is carried on a cantilevered leaf spring connected to the pivoted end of the lever, the spring carrying at its other end a roller, with the roller being out of engagement with a cartridge when the lever is in its first position and being spring biased into engagement with the cartridge when the lever approaches and is in its second position.

7. A locking and ejection mechanism for a tape player using an exchangeable cartridge, including in combination:

a lever pivoted at one end and carrying an ejection projection remote from the pivoted end, said projection extending into the path travelled by said cartridge when a cartridge is inserted into the apparatus;

a cantilever leaf spring connected substantially at an acute angle to the pivoted end of the lever and carrying at its other end a cartridge-engaging member;

a solenoid located in alignment with a portion of the lever and adapted to attract and hold the lever when the lever is moved from a first position to a second position by insertion of a cartridge into the apparatus, said solenoid holding the lever in said second position so long as the solenoid is energized;

said cartridge-engaging member engaging the cartridge against the biasing action of the cantilever spring which forms substantially a right angle with the lever when the lever is in its second position, and deenergization of the solenoid allowing the spring to return to an acute angle relative to the lever, returning the lever to said first position, thereby causing the ejector means to engage the tape cartridge and to eject the same from the apparatus while simultaneously causing the cartridge-engaging member to be disengaged from the cartridge.

8. The combination according to claim 7 wherein the cartridge-engaging member comprises a roller carried by said leaf spring.

9. The combination according to claim 7 wherein the portion of the lever attracted by the solenoid is a second projection on the lever.

10. The combination according to claim 7 wherein the second projection lies in a different plane than the plane of the ejection projection, said plane of the second projection being located at a greater distance from the end of the apparatus into which a cartridge is inserted than the plane of the ejection projection.